(12) United States Patent
Hirota et al.

(10) Patent No.: US 9,688,130 B2
(45) Date of Patent: Jun. 27, 2017

(54) FUEL CELL VEHICLE

(71) Applicant: SUZUKI MOTOR CORPORATION, Hamamatsu-Shi, Shizuoka-Ken (JP)

(72) Inventors: Kazuyuki Hirota, Hamamatsu (JP); Akihiro Fukunaga, Hamamatsu (JP); Toru Eguchi, Hamamatsu (JP)

(73) Assignee: SUZUKI MOTOR CORPORATION (JP)

( * ) Notice: Subject to any disclaimer, the term of this patent is extended or adjusted under 35 U.S.C. 154(b) by 0 days.

(21) Appl. No.: 15/335,834

(22) Filed: Oct. 27, 2016

(65) Prior Publication Data

US 2017/0113532 A1   Apr. 27, 2017

(30) Foreign Application Priority Data

Oct. 27, 2015  (JP) .................................. 2015-210396

(51) Int. Cl.
*B60K 1/04* (2006.01)
*H01M 8/04082* (2016.01)
*B60L 11/00* (2006.01)

(52) U.S. Cl.
CPC .............. *B60K 1/04* (2013.01); *B60L 11/002* (2013.01); *H01M 8/04201* (2013.01); *B60Y 2304/074* (2013.01); *H01M 2250/20* (2013.01)

(58) Field of Classification Search
CPC ... B60K 1/04; B60L 11/002; B60Y 2304/074; H01M 8/04201; H01M 2250/20
USPC ....................................................... 180/291
See application file for complete search history.

(56) References Cited

U.S. PATENT DOCUMENTS

| 6,648,085 | B2 * | 11/2003 | Nagura | ..................... | B60K 1/00 |
| | | | | | 180/65.1 |
| 6,679,345 | B2 * | 1/2004 | Hirayama | ........... | B60L 11/1881 |
| | | | | | 180/220 |
| 6,715,571 | B2 * | 4/2004 | Nakamori | ................ | B60K 1/04 |
| | | | | | 180/233 |
| 6,793,027 | B1 * | 9/2004 | Yamada | ................... | B60K 1/04 |
| | | | | | 180/65.1 |
| 6,889,788 | B2 * | 5/2005 | Hakamata | .............. | B62K 11/06 |
| | | | | | 180/219 |
| 7,121,366 | B2 * | 10/2006 | Horii | ................... | B60L 11/1881 |
| | | | | | 180/220 |

(Continued)

FOREIGN PATENT DOCUMENTS

JP         2014213817 A      11/2014

*Primary Examiner* — J. Allen Shriver, II
*Assistant Examiner* — Brian Cassidy
(74) *Attorney, Agent, or Firm* — Barnes & Thornburg LLP

(57) ABSTRACT

A fuel cell vehicle capable of preventing illegally access by using a tool to a piping fitting connecting fuel piping and a valve module to each other without increasing the number of components. The fuel cell vehicle includes an electric motor, a fuel cell supported by a frame to supply electric power to the electric motor, a fuel tank supported by the frame to store fuel to be supplied to the fuel cell, a valve module disposed below a cross member and behind the fuel tank, and a piping fitting connecting fuel piping to the valve module. The valve module includes a cut-out stepped portion provided in a side-face side of an upper portion of the valve module. The piping fitting is attached to the cut-out side face, the piping fitting being disposed between the cross member and the cut-out top face in a vehicle vertical direction.

2 Claims, 9 Drawing Sheets

(56) References Cited

U.S. PATENT DOCUMENTS

| | | | | |
|---|---|---|---|---|
| 7,195,282 B2* | 3/2007 | Mizuno | | B60K 1/02 220/562 |
| 7,401,670 B2* | 7/2008 | Horii | | H01M 8/04156 180/220 |
| 7,798,269 B2* | 9/2010 | Makuta | | H01M 8/2475 180/220 |
| 7,868,775 B2* | 1/2011 | Sirosh | | F17C 11/005 340/447 |
| 7,921,947 B2* | 4/2011 | Horii | | B60K 1/04 180/210 |
| 8,118,129 B2* | 2/2012 | Ito | | B60K 1/04 180/220 |
| 8,435,688 B2* | 5/2013 | Shimizu | | B60L 11/1881 429/434 |
| 8,622,163 B2* | 1/2014 | Eguchi | | B62K 11/10 180/220 |
| 9,543,598 B2* | 1/2017 | Otsuka | | B60L 11/1898 |
| 9,592,877 B2* | 3/2017 | Takada | | B62K 11/10 |
| 2002/0162693 A1* | 11/2002 | Mizuno | | B60L 11/1892 180/65.1 |
| 2004/0050606 A1* | 3/2004 | Yang | | B62M 7/12 180/220 |
| 2005/0019632 A1* | 1/2005 | Horii | | B60L 11/1887 429/439 |
| 2005/0051370 A1* | 3/2005 | Horii | | B60L 11/18 180/65.1 |
| 2006/0037793 A1* | 2/2006 | Horii | | B62M 7/02 180/89.2 |
| 2006/0040144 A1* | 2/2006 | Shimizu | | H01M 8/04089 429/437 |
| 2006/0040145 A1* | 2/2006 | Tokumura | | B62K 19/30 429/437 |
| 2006/0040154 A1* | 2/2006 | Makuta | | B62M 7/12 180/68.2 |
| 2006/0040161 A1* | 2/2006 | Horii | | B62M 7/02 180/65.1 |
| 2006/0060400 A1* | 3/2006 | Iwashita | | B62M 7/12 180/65.31 |
| 2006/0251946 A1* | 11/2006 | Makuta | | H01M 8/2475 429/470 |
| 2006/0278452 A1* | 12/2006 | Shimizu | | H01M 8/04007 180/68.3 |
| 2007/0074682 A1* | 4/2007 | Makuta | | H01M 8/04014 123/41.1 |
| 2007/0122671 A1* | 5/2007 | Shimizu | | B60L 11/1881 429/439 |
| 2007/0248857 A1* | 10/2007 | Kurosawa | | H01M 8/04029 429/413 |
| 2008/0026273 A1* | 1/2008 | Muramatsu | | H01M 8/04201 429/434 |
| 2008/0038608 A1* | 2/2008 | Yoshida | | H01M 8/04097 429/415 |
| 2008/0057374 A1* | 3/2008 | Kurosawa | | H01M 8/04089 429/444 |
| 2008/0093148 A1* | 4/2008 | Takahashi | | B60L 11/1881 180/220 |
| 2008/0107942 A1* | 5/2008 | Muramatsu | | H01M 8/04194 429/429 |
| 2008/0113238 A1* | 5/2008 | Ito | | H01M 8/04194 429/429 |
| 2008/0118791 A1* | 5/2008 | Ito | | H01M 8/04186 429/431 |
| 2008/0124595 A1* | 5/2008 | Muramatsu | | H01M 8/04194 429/444 |
| 2008/0166607 A1* | 7/2008 | Muramatsu | | H01M 8/04014 429/449 |
| 2008/0217087 A1* | 9/2008 | Ito | | B60K 1/04 180/220 |
| 2008/0236914 A1* | 10/2008 | Horii | | B60L 11/1881 180/65.31 |
| 2008/0286613 A1* | 11/2008 | Furukawa | | H01M 8/04223 429/410 |
| 2009/0000837 A1* | 1/2009 | Horii | | B60K 1/04 180/65.31 |
| 2009/0020347 A1* | 1/2009 | Horii | | B62J 35/00 180/65.31 |
| 2009/0032749 A1* | 2/2009 | Ishihara | | F16K 31/1223 251/73 |
| 2009/0061269 A1* | 3/2009 | Muramatsu | | H01M 8/04313 429/430 |
| 2009/0075152 A1* | 3/2009 | Horji | | B62K 5/027 429/444 |
| 2009/0266636 A1* | 10/2009 | Naegeli | | B62M 6/60 180/206.5 |
| 2010/0294582 A1* | 11/2010 | Eguchi | | B62K 11/10 180/220 |
| 2010/0300785 A1* | 12/2010 | Tamura | | B60K 1/04 180/68.5 |
| 2013/0075179 A1* | 3/2013 | Iida | | H01M 16/006 180/220 |
| 2013/0202979 A1* | 8/2013 | Katano | | H01M 8/04761 429/444 |
| 2013/0302713 A1* | 11/2013 | Yamamoto | | H01M 8/04201 429/442 |
| 2014/0196972 A1* | 7/2014 | Sangha | | B60K 13/06 180/309 |
| 2016/0056482 A1* | 2/2016 | Otsuka | | B60L 11/1898 180/220 |

* cited by examiner

FUEL CELL VEHICLE

CROSS-REFERENCE TO RELATED APPLICATIONS

This application claims the benefit of priority of Japanese Patent Application No. 2015-210396, filed on Oct. 27, 2015, the entire contents of which are incorporated herein by reference.

BACKGROUND OF THE INVENTION

Field of the Invention

The present invention relates to a fuel cell vehicle.

Description of the Related Art

A fuel cell four-wheeled vehicle according to Japanese Patent Laid-Open No. 2014-213817 includes a fuel tank for storing high-pressure gas, for example, the hydrogen gas as fuel and a pressure reducing valve adjusting pressure of the high-pressure gas to supply the gas to the fuel cell. The fuel tank and the pressure reducing valve are disposed in a lower section of a vehicle body. Thus, a piping fitting connecting components of a fuel system, for example, the fuel tank and the pressure reducing valve connected to each other through piping cannot be touched unless the vehicle body is lifted with a lifting device.

SUMMARY OF THE INVENTION

In contrast, a fuel cell vehicle such as a fuel cell motorcycle and a fuel cell tricycle will expose its fuel system if exterior components such as a cowling and a cover are removed, and thus a tool can be used while approaching or accessing a piping fitting connecting the components of the fuel system to each other. Thus, the fuel cell vehicle has a possibility that the piping fitting may be illegally accessed if the exterior components are broken.

To solve the problems described above, it is an object of the present invention to provide a fuel cell vehicle capable of preventing illegally access by using a tool to a piping fitting connecting fuel piping and a valve module to each other without increasing the number of components.

To achieve the above object, an aspect of the present invention provides a fuel cell vehicle including a frame having a cross member, an electric motor driving a driving wheel, a fuel cell supported by the frame to supply electric power to the electric motor, a fuel tank supported by the frame to store fuel to be supplied to the fuel cell, a valve module disposed below the cross member and behind the fuel tank, fuel piping, and a piping fitting connecting the fuel piping to the valve module. The valve module includes a cut-out stepped portion provided in a side-face side of an upper portion of the valve module, the cut-out stepped portion being defined by a cut-out top face and a cut-out side face extending upward from the cut-out top face. The piping fitting is attached to the cut-out side face, the piping fitting being disposed between the cross member and the cut-out top face in a vehicle vertical direction.

In preferred embodiments of the above aspect, the following modes may be provided.

It may be further desired that a swing arm disposed behind the piping fitting to support the driving wheel, and a pivot shaft disposed behind the cross member to support the swing arm in the frame in a swingable manner. The swing arm has a front end portion overlapping with the piping fitting as viewed from the fuel cell vehicle longitudinal direction.

This fuel cell vehicle capable of preventing fraud access by using a tool to a piping fitting connecting fuel piping and a valve module to each other without increasing the number of components.

DETAILED DESCRIPTION OF THE PREFERRED EMBODIMENT

Hereinafter, an embodiment of a fuel cell vehicle according to the present invention will be described with reference to FIGS. 1 to 9.

Figure 1:
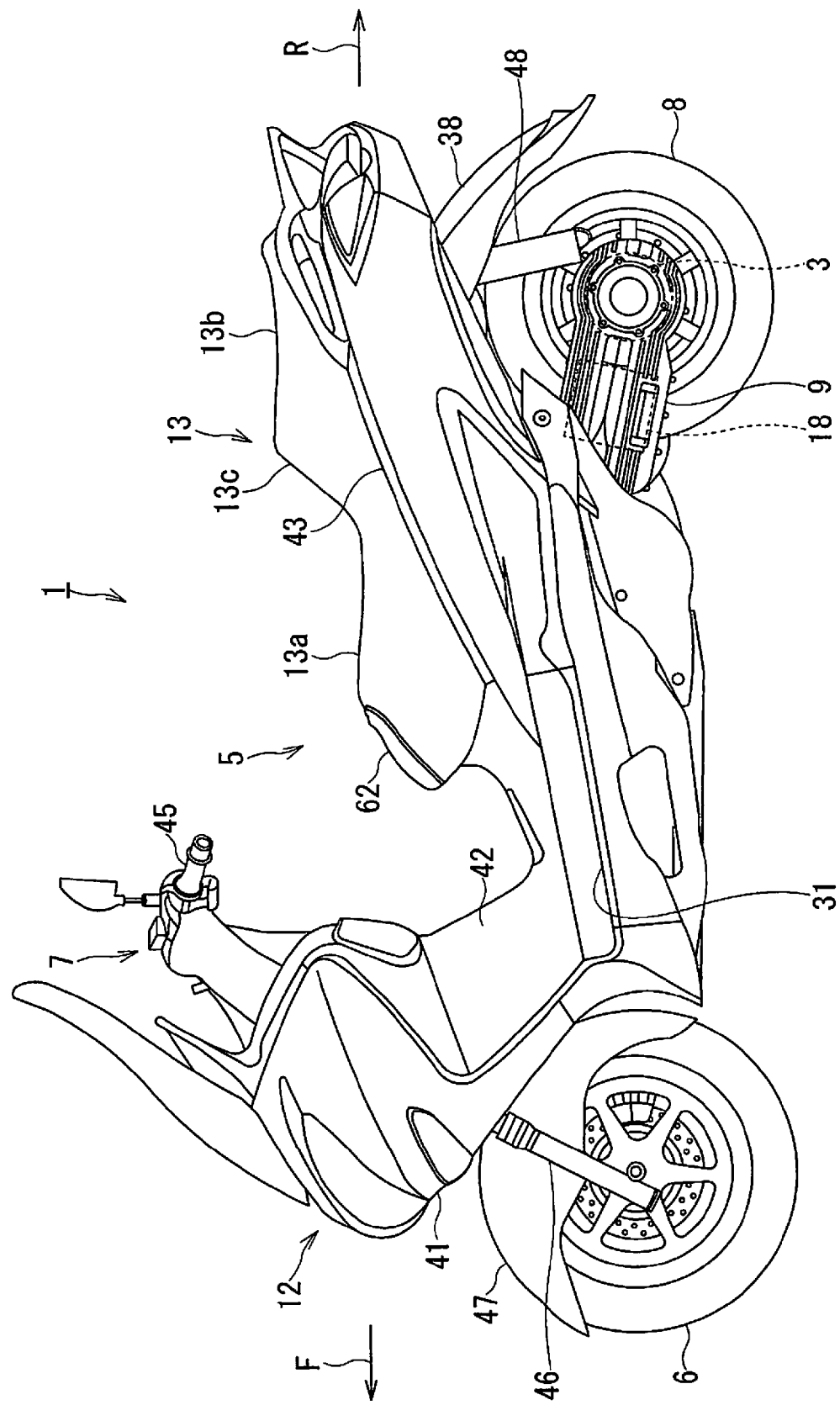
FIG. 1 is a left side view of a fuel cell vehicle according to the present invention.

FIG. 1 is a left side view of the fuel cell vehicle according to an embodiment of the present invention.

Figure 2:
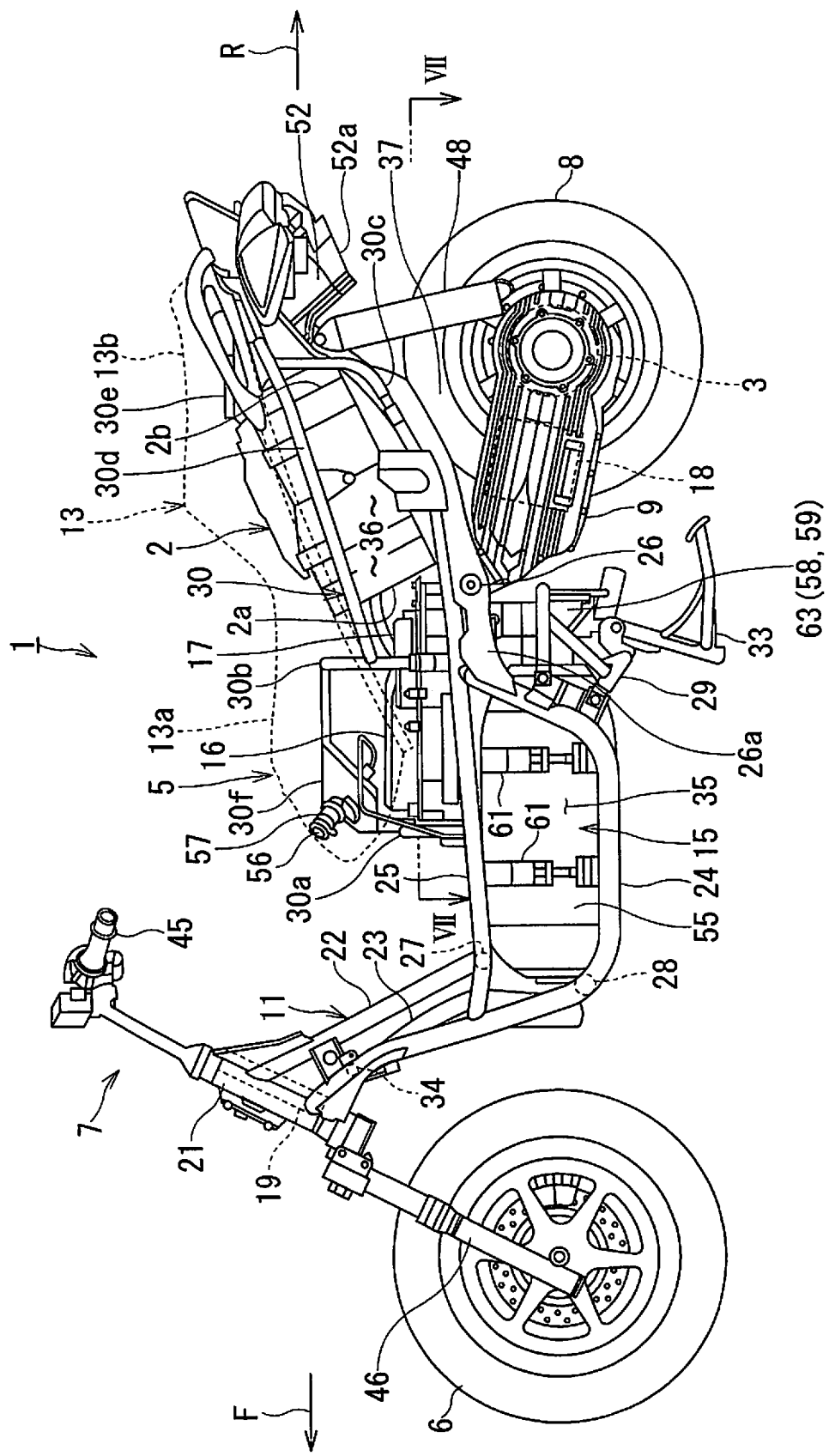
FIG. 2 is a left side view of the fuel cell vehicle according to the present invention, with its exteriors being detached.

FIG. 2 is a left side view of the fuel cell vehicle according to an embodiment of the present invention, with its exteriors, for example, covers and a seat detached.

Figure 3:
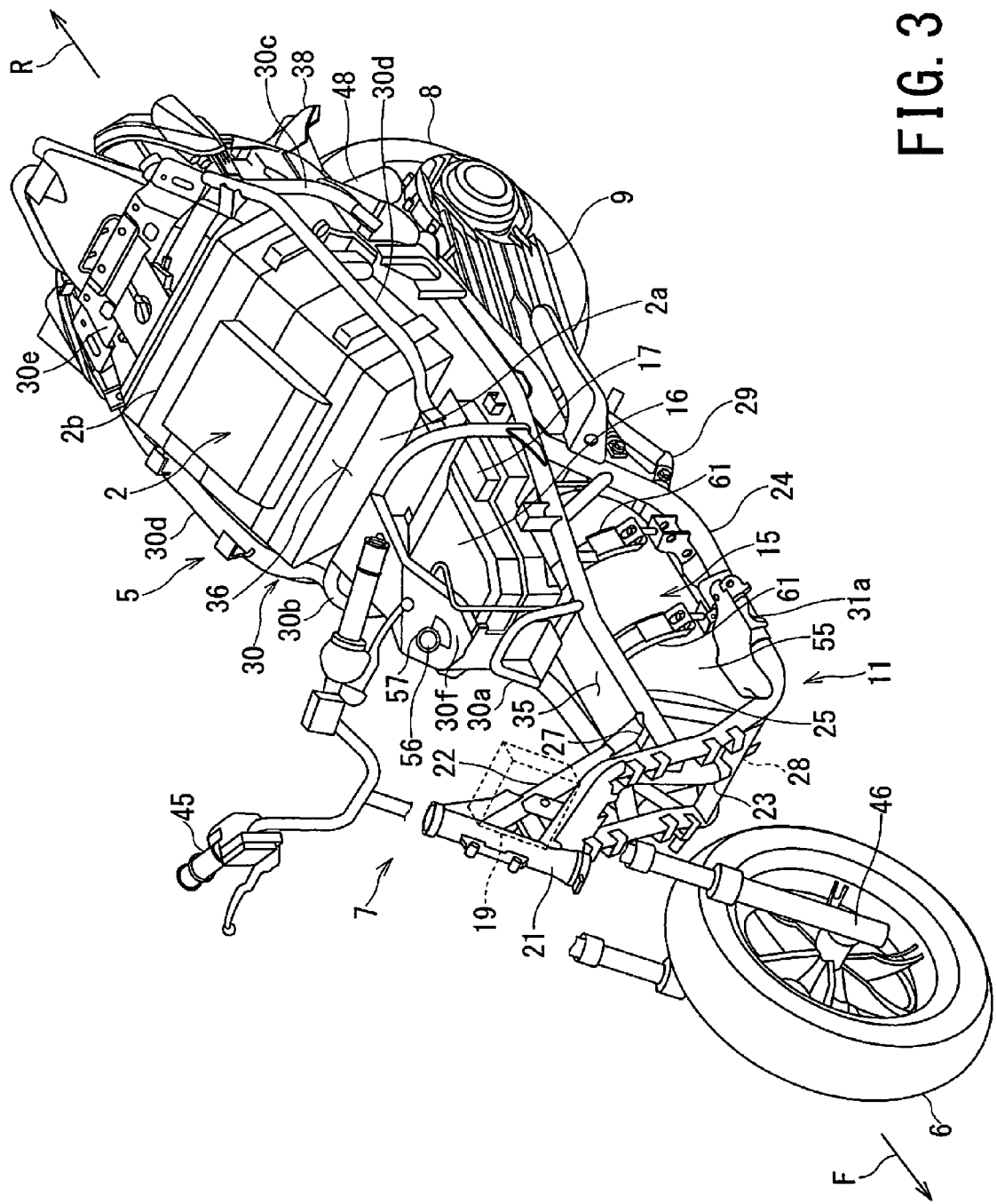
FIG. 3 is a perspective view of the fuel cell vehicle according to the present invention, with its exteriors being detached.

FIG. 3 is a perspective view of the fuel cell vehicle according to an embodiment of the present invention, with its exteriors, for example, covers and a seat detached.

Note that expressions of front-and-rear, up-and-down, and left-and-right in the present embodiment are based on reference to a rider onboard a fuel cell vehicle 1. In FIGS. 1 to 3, a solid line arrow F represents forward of the fuel cell vehicle 1, and a solid line arrow R represents reward of the fuel cell vehicle 1.

As shown in FIGS. 1 to 3, the fuel cell vehicle 1 according to the present embodiment travels by being driven by an electric motor 3 powered by a fuel cell 2. The fuel cell vehicle 1 is a motorcycle of motor-scooter type, and also a fuel cell powered bicycle traveling by the power of the fuel cell 2. The fuel cell vehicle 1 may also be a tricycle. It may be a type of vehicle that travels by being driven by the electric motor 3 that is powered by a rechargeable battery (not shown) in place of the fuel cell 2.

The fuel cell vehicle 1 includes a vehicle body 5 extending forward and rearward, a front wheel 6 as a steered wheel, a steering mechanism 7 supporting the front wheel 6 in a steerable manner, a rear wheel 8 as a driving wheel, a swing arm 9 supporting the rear wheel 8 so as to be swingable in the up and down direction, and the electric motor 3 which generates driving power of the rear wheel 8.

The vehicle body 5 includes a frame 11 extending forward and rearward of the vehicle, an exterior 12 covering the frame 11, and a seat 13 disposed above a rear half part of the frame 11.

Further, the vehicle body 5 includes a fuel cell 2, a fuel tank 15 configured to store high pressure gas of hydrogen as a fuel to be used for power generation in the fuel cell 2, a rechargeable battery 16 configured to supplement power of the fuel cell 2, a power management apparatus 17 configured to adjust output voltage of the fuel cell 2 and control power distribution between the fuel cell 2 and the rechargeable battery 16, an inverter 18 configured to convert DC power outputted by the power management apparatus 17 into three-phase AC power and outputs it to the electric motor 3 to operate the electric motor 3, and a vehicle controller 19 configured to comprehensively control those mentioned before.

A power train of the fuel cell vehicle 1 includes the fuel cell 2 and the rechargeable battery 16, is a system which appropriately utilizes power of each power supply depending on travelling conditions of the vehicle, power generation conditions of the fuel cell 2, and power storage conditions of the rechargeable battery 16. The fuel cell vehicle 1 generates regenerative power at the electric motor 3 during deceleration. The rechargeable battery 16 and the fuel cell 2, which are power sources of the vehicle, are connected in parallel to the inverter 18 and supply power to the electric motor 3. The rechargeable battery 16 stores regenerative power generated at the electric motor 3 when the fuel cell vehicle 1 decelerates, and power generated by the fuel cell 2.

The frame 11 is made up of a plurality of steel hollow pipes combined into a single body. The frame 11 includes a head pipe 21 disposed above the front end of the frame 11, an upper down-frame 22 extending from a central part of the head pipe 21 in a rearwardly and downwardly inclined manner, a lower down-frame 23 disposed below the head pipe 21 and extending in a rearwardly and downwardly inclined manner, a pair of left and right lower frames 24, a pair of left and right upper frames 25, a pivot shaft 26, an upper bridge frame 27, a lower bridge frame 28, a guard frame 29, and a mounted-instrument protection frame 30.

The head pipe 21 supports the steering mechanism 7 so as to be steerable, that is, to be swingable in the left and right direction of the fuel cell vehicle 1.

The pair of left and right lower frames 24 are disposed in the left and the right of the lower down-frame 23 and connected to a lower part of the head pipe 21. The pair of left and right lower frames 24 each include a front-side inclined portion extending from a connected portion with the head pipe 21 substantially in parallel along the lower down-frame 23 and in a rearwardly and downwardly inclined manner, a front-side curved portion curved rearwardly at a lower end of the front-side inclined portion, and a straight portion extending substantially horizontally from a rear end of the front-side curved portion toward rearward of the vehicle body 5 in a linear manner until reaching a central portion of the vehicle body 5, that is, a central portion in the front and rear direction of the fuel cell vehicle 1. The pair of left and right lower frames 24 each include a rear-side curved portion curved toward rearward and upward from a rear end part of the straight portion, a rear-side inclined portion extending from an upper end part of the rear-side curved portion in a rearwardly and upwardly inclined manner, and an upper and lower frame joining part connecting the rear-side inclined portion to the upper frame 25. A spacing between the left and right lower frames 24 is wider than that between the left and right upper frames 25.

A near-head-pipe bridge frame 34 is constructed between upper parts of the left and right lower frames 24. The near-head-pipe bridge frame 34 extends in a linear manner substantially in the left and right direction of the fuel cell vehicle 1. Each of the left and right lower frames 24 includes a foot rest bracket 31*a*. The foot rest bracket 31*a* supports a foot board 31, which is disposed on the outer side of the front-side curved portion, from below. A rider can lay its foot on the foot board 31.

The lower frame 24 being disposed on the left side of the vehicle body 5 includes a side stand bracket (not shown). The side stand bracket (not shown) is provided with a side stand (not shown) configured to make the fuel cell vehicle 1 stand by itself in a leftwardly inclined manner. The side stand swings between an erected position for making the fuel cell vehicle 1 stand by itself, and a retracted position for making it stay along the vehicle body 5 so as not to impede travelling.

The pair of left and right upper frames 25 are connected to a central part in the up-and-down direction of the front-side inclined portion of the lower frame 24 in a front half part of the vehicle body 5. The pair of left and right upper frames 25 each include, horizontal portions extending from a connected portion with the front-side inclined portion of the lower frame 24 toward rearward of the vehicle body 5 in a substantially horizontal manner, and rear end parts being rear ends of the horizontal portions of the pair of left and right upper frames 25, the rear end parts being significantly inclined rearwardly and upwardly in the rear half part of the vehicle body 5 and above the rear wheel 8, the rear end parts curved inwardly in the left and right direction of the vehicle body 5 to come close to each other to an extent of about thickness (width size) of the rear wheel 8.

The pivot shaft 26 is constructed between the left and right upper frames 25 in the rear half part of the vehicle body 5. The pivot shaft 26 is constructed between a pair of left and right brackets 26*a*. Each of the brackets 26*a* is located below the upper frame 25 and in the rear of a merging portion (upper and down frame joining part) between the upper frame 25 and the lower frame 24. Each of the brackets 26*a* is connected to the horizontal portion of the upper frame 25, and to the rear-side inclined portion of the lower frame 24.

The upper bridge frame 27 is constructed between the front end parts of the left and right upper frames 25. The upper bridge frame 27 extends substantially linearly in the left and right direction of the vehicle between the left and right upper frames 25 to interconnect the left and right upper frames 25.

The lower bridge frame 28 is constructed between the front-side curved portions of the left and right lower frames 24. The lower bridge frame 28 extends substantially linearly in the left and right direction of the vehicle between the left and right lower frames 24 to interconnect the left and right lower frames 24.

The guard frame 29 is constructed between the rear-side curved portions of the left and right lower frames 24. The guard frame 29 extends rearwardly and downwardly from a connected portion with the left and right lower frames 24, and extends into a rearwardly declined U-shape so as to enlarge the internal space of the frame 11. The guard frame 29 is provided with a center stand 33 configured to make the fuel cell vehicle 1 stand by itself in an upright state. The center stand 33 swings between an erected position for making the fuel cell vehicle 1 stand by itself, and a retracted position for making it stay along the vehicle body 5 so as not to impede travelling.

The upper down-frame 22 is constructed between the head pipe 21 and the upper bridge frame 27.

The lower down-frame 23 includes an upper end part connected to a central part in the left and right direction of the fuel cell vehicle 1 of a near-head-pipe bridge frame 34 constructed between the left and right lower frames 24, and a lower end part connected to a central part in the left and right direction of the fuel cell vehicle 1 of the lower bridge frame 28.

The mounted-instrument protection frame 30 is provided above the rear half part of the upper frame 25. The mounted-instrument protection frame 30 supports and secures the fuel cell 2 to the fuel cell vehicle 1. A part of the mounted-instrument protection frame 30 can be attached and detached to and from the upper frame 25.

The seat 13 extends forward and rearward covering an upper section of the rear half part of the frame 11. The seat 13 is of a tandem type and includes a front half part 13a on which the rider is to be seated, a rear half part 13b on which a passenger is to be seated, and an inclined part 13c between the front half part 13a and the rear half part 13b.

Here, a space surrounded by the left and right upper frames 25 and the left and right lower frames 24 is referred to as a center tunnel region 35. A space surrounded by the rear half part of the upper frame 25, exterior 12, and the seat 13 as an instrument mounting region 36. A space in the rear of the center tunnel region 35 and below the instrument mounting region 36 as a tire house region 37.

The center tunnel region 35 accommodates the fuel tank 15. In the fuel cell vehicle 1 of a motor-scooter type according to the present embodiment, the center tunnel region 35 is disposed along the front and rear direction of the fuel cell vehicle 1 and between left and right foot boards 31 on which the rider places its foot, and rises higher than the foot board 31 such that the foot resting region of the foot board 31 is divided into left and right sections. In other words, the foot board 31, which serves as the foot resting region, is disposed in the left and right of the center tunnel region 35, and the fuel tank 15 is disposed between the left and right foot boards 31.

The instrument mounting region 36 accommodates the rechargeable battery 16, the power management apparatus 17, and the fuel cell 2 in this order from the front side of the vehicle body 5. The mounted-instrument protection frame 30 protects the front end part, the central part, the rear end part, and a side part ranging from the central part to the rear end part of the instrument mounting region 36.

The mounted-instrument protection frame 30 surrounds the instrument mounting region 36 and protects instruments to be mounted in the instrument mounting region 36. The mounted-instrument protection frame 30 includes a front protection frame 30a disposed in the front end part of the instrument mounting region 36, the front protection frame 30a being constructed between the left and right upper frames 25 in an upwardly convex arch shape, a center protection frame 30b disposed in a central part of the instrument mounting region 36 and in the rear of a merging spot between the upper frame 25 and the lower frame 24, the center protection frame 30b being constructed between the left and right upper frames 25 in an upwardly convex arch shape, a pair of left and right rear protection frames 30c disposed at a rear end part of the instrument mounting region 36, the pair of left and right rear protection frames 30c being connected to a portion where each of the left and right upper frames 25 is curved inwardly, the pair of left and right rear protection frames 30c extending rearward and obliquely upward from the curved portion, a pair of left and right side protection frames 30d extending rearward from each of the left and right of the center protection frame 30b to be connected to the upper end parts of the rear protection frames 30c, the pair of left and right side protection frames 30d reaching the rear end part of the vehicle body 5, a bracket 30e constructed between rear end parts of the left and right side protection frames 30d.

The left and right upper frames 25 are bent at a spot where the lower ends of the front protection frame 30a are joined thereto, increase the spacing therebetween toward the rear of the fuel cell vehicle 1. The left and right upper frames 25 are bent at a spot where the lower ends of the center protection frame 30b are joined thereto, and extend to the rear of the fuel cell vehicle 1. Thus, the center protection frame 30b has a larger width and a larger height than those of the front protection frame 30a. The rear protection frame 30c and the pair of the left and right side protection frames 30d are integrated.

The rear protection frame 30c and the pair of left and right side protection frames 30d are detachably interconnected to the center protection frame 30b and the upper frames 25, thereby supporting the fuel cell 2.

A rear wheel 8 is disposed in the tire house region 37.

Between the instrument mounting region 36 and the tire house region 37, a rear fender 38 as a partition member for dividing respective regions is provided.

The exterior 12 includes, a front leg-shield cover 41 covering a front half part of the vehicle body 5, a front frame cover 42 disposed above the center of the vehicle body 5 and covering an upper section of the upper frame 25 such as the center tunnel region 35, and a frame cover 43 disposed in a rear half part of the vehicle body 5 and covering a lower portion of the seat 13.

The frame cover 43 along with the seat 13 surrounds the instrument mounting region 36. The instrument mounting region 36 is a closed space surrounded by the seat 13, the frame cover 43, and the rear fender 38. The instrument mounting region 36 easily and securely controls flow of air to the fuel cell 2 by means of a vent hole (not shown) provided in an appropriate area of the frame cover 43 or the rear fender 38, and also easily and securely controls flow of air as a cooling wind to an apparatus, which needs to be cooled. The instrument mounting region 36 allows air to enter from, for example, a joint of each cover (such as the front frame cover 42, and a frame cover 43).

The steering mechanism 7 is disposed in a front section of the vehicle body 5 and swings in the left and right direction centering on the head pipe 21 of the frame 11, thereby enabling steering of the front wheel 6. The steering mechanism 7 includes a handle 45 provided in a top part, and a pair of left and right front forks 46 interconnecting the handle 45 and the front wheel 6, and the pair of left and right front forks 46 extending in the up and down direction slightly inclined rearwardly. The left and right front forks 46 have a telescopic structure that can be elastically expanded and contracted. An axle (not shown) for rotatably supporting the front wheel 6 is constructed between lower end parts of the left and right front forks 46. The front fender 47 is disposed above the front wheel 6. The front fender 47 is located between the left and right front forks 46, and secured to the front fork 46.

The front wheel 6 is a driven wheel that is rotatable about the axle constructed between the lower end parts of the left and right front forks 46.

The swing arm 9 swings in the up and down direction about the pivot shaft 26 as a rotational center extending in the left and right direction of the vehicle body 5. The swing arm 9 rotatably supports the rear wheel 8 between a pair of arms extending in the front and rear direction on left and right sides of the vehicle body 5, respectively. A rear suspension 48 is constructed between the frame 11 and the swing arm 9. The upper end part of the rear suspension 48 is swingably supported at the rear end part of the upper frame 25. The lower end part of the rear suspension 48 is swingably attached to the rear end part of the swing arm 9. The rear suspension 48 buffers the swinging of the swing arm 9.

The swing arm 9 accommodates a electric motor 3 rotationally driving the rear wheel 8, and an inverter 18 converting DC power supplied from the fuel cell 2 into AC power to supply it to the electric motor 3.

The electric motor 3 rotationally drives the rear wheel 8 with power supplied from the fuel cell 2 or the rechargeable battery 16, thereby causing the fuel cell vehicle 1 to travel. The electric motor 3 is accommodated in a rear part of the swing arm 9 and coaxially disposed with the axle of the rear wheel 8. The electric motor 3 is integrally assembled to the swing arm 9 to constitute a unit-swing-type swing arm.

The inverter 18 is accommodated in a front part of the swing arm 9, and disposed between the pivot shaft 26 and the electric motor 3. The inverter converts DC power outputted by the power management apparatus 17 into three-phase AC power, and adjusts the rotational speed of the electric motor 3 by altering the frequency of the AC power.

The rear wheel 8 is the driving wheel being supported by the axle (not shown) to which driving force is transferred from the electric motor 3.

The fuel cell 2 generates power by causing reaction between a fuel and an oxidizing agent. The fuel cell 2 is an air-cooled fuel cell system generating power by using a high pressure gas, for example, hydrogen gas as the fuel, and oxygen in the air as the oxidizing agent, and is cooled by using air.

The fuel cell 2 is disposed on the rear half side of the instrument mounting region 36. The fuel cell 2 is disposed below the seat 13 over a range from an inclined part between the front half part 13a and rear half part 13b to the rear half part 13b. That is, in the side view of the vehicle, the fuel cell 2 is disposed between the rear half part 13b of the seat 13, on which the passenger is to be seated, and the rear wheel 8 and the swing arm 9.

The fuel cell 2 has a cuboidal shape having a long side extending in the front and rear direction of the vehicle body 5, and is disposed in the instrument mounting region 36 in a posture in which its front face, in which the intake port 2a is disposed, faces forward and obliquely downward, and its back face, in which the exhaust port 2b is disposed, faces rearward and obliquely upward. That is, the fuel cell 2 is secured to the frame 11 in a forward leaning posture in which its front side is located lower than its rear side. The upper part of the fuel cell 2 is secured to a mounted instrument protection frame 30 and the lower part of the fuel cell 2 is secured to the upper frame 25.

The fuel cell 2 includes a plurality of flat modules interconnected from the front side toward the rear side. The fuel cell 2 includes a filter (not shown), an intake shutter (not shown), a fuel cell stack (not shown), a fan (not shown), and an exhaust shutter (not shown), which are interconnected by being superposed on each other in a laminated state in order from the front side. A fuel cell control unit (not shown) is provided on the top face of the fuel cell 2.

The intake shutter includes an openable/closable intake port 2a of air, and configured to control the amount of air introduced to the fuel cell stack by opening/closing the intake port 2a. The intake shutter configured to constitute a circulation path for circulating air in the fuel cell 2 by closing the intake port 2a. The exhaust shutter includes an openable/closable exhaust port 2b of air and configured to constitute the circulation path for circulating air in the fuel cell 2 by closing the exhaust port 2b. In other words, the fuel cell 2 includes the openable/closable intake port 2a in the front face, and the openable/closable exhaust port 2b in the back face, and configured to cause air to be circulated in the fuel cell 2 by closing the intake port 2a and the exhaust port 2b.

The fuel cell stack causes electrochemical reaction between oxygen contained in the air drawn through the intake port and hydrogen supplied from the fuel tank 15 to generate power, and produces a wet excess gas after generation.

The fan generates intake negative pressure for drawing air in the instrument mounting region 36 from the intake port into the fuel cell 2, while drawing out the excess gas from the fuel cell stack and discharges it from the exhaust port. The flow of air being caused by the fan is used for the power generation in the fuel cell stack, as well as for the cooling of the fuel cell 2.

An exhaust duct 52 is provided in the rear of the fuel cell 2. The fan of the fuel cell 2 draws out excess gas from the fuel cell stack and discharges it to the exhaust duct 52. The front end part of the exhaust duct 52 is airtightly connected to a box, which is a frame body of the exhaust shutter, of the fuel cell 2. The exhaust duct 52 includes an exhaust port 52a opened toward rearwardly downward, and rearwardly upward at the rear end of the vehicle body 5. The exhaust duct 52 guides exhaust gas (excess gas) ejected from the fan of the fuel cell 2 to the exhaust port 52a and discharges it to the rear of the vehicle body 5.

The exhaust port 52a is disposed higher than the exhaust face (back face), and preferably at the upper end part of the rear section of the exhaust duct 52. In other words, the upper edge part of the exhaust port 52a is disposed at a position higher than the exhaust port of the fuel cell 2. As a result of having the exhaust port 52a disposed to be higher than the exhaust face (back face) of the fuel cell 2, the exhaust duct 52 guides a wet excess gas containing unreacted hydrogen gas to the exhaust port 52a and securely discharge it from the vehicle body 5.

The fuel tank 15 is a high-pressure compressed hydrogen storage system. The fuel tank 15 includes a pressure vessel 55 made of carbon fiber reinforced plastic (CFRP), or being a composite vessel made from an aluminum liner, a fuel filling joint 57 having a fuel filling port 56, a fuel filling main valve 58, a fuel supply main valve 59 integrally including a shut-off valve (not shown) and a regulator (not shown), and a secondary pressure reducing valve (not shown).

The pressure vessel 55 is a composite vessel made from an aluminum liner which stores hydrogen gas as fuel of the fuel cell 2. The fuel tank 15 stores, for example, hydrogen gas of about 70 megapascal (MPa.) The pressure vessel 55 includes a cylinder-shaped barrel part, and a dome-shaped mirror plate provided on front and rear end faces of the barrel part. The pressure vessel 55 is disposed in the center tunnel region 35 with the central axis of the cylindrical barrel being aligned along the front and rear direction of the vehicle body 5. The pressure vessel 55 is surrounded by a pair of upper frames 25, a pair of lower frames 24, a lower bridge frame 28, and a guard frame 29, and is robustly protected against load due to turning over or collision of the fuel cell vehicle 1.

The pressure vessel 55 is supported in the center tunnel region 35 by a clamp band 61 constructed between an upper frame 25 disposed at one side of the vehicle body 5, for example, the upper frame 25 disposed at the right side of the vehicle body 5, and a lower frame 24 disposed at another side of the vehicle body, for example, the lower frame 24 disposed at the left side of the vehicle body 5. The pressure vessel 55 is placed on a lower clamp band, for example, a lower half part of the clamp band 61 being constructed between the right side upper frame 25 and an left side lower frame 24, and is clamped by the upper clamp band, for example, an upper half part of the clamp band 61 to be sandwiched. Note that the clamp band 61 may be constructed between the upper frame 25 disposed at the left side of the vehicle body 5 and the lower frame 24 disposed at the right side of the vehicle body 5.

The fuel filling joint 57 is disposed outside of the center tunnel region 35, more specifically, rearwardly upward of the center tunnel region 35, and at the front end part of the instrument mounting region 36. The fuel filling joint 57 is disposed to be higher than or just above the rechargeable battery 16. The fuel filling joint 57 is secured to the joint bracket 30f being constructed between the upper parts of the front protection frame 30a and the center protection frame 30b of the mounted-instrument protection frame 30. The fuel filling joint 57 extends toward upward, and slightly leftward of the vehicle body 5 such that a facility side joint can be inserted from the upper side and left side of the vehicle body at the time of fuel filling. The fuel filling joint 57 is covered and hidden by the fuel filling port lid 62 being disposed at the front end of the seat 13. The fuel filling port lid 62 is supported to the seat 13 via a hinge mechanism (not shown), and opens/closes by being swung. The fuel filling joint 57 has a fuel filling port 56 as an inlet for introducing high pressure gas of hydrogen as a fuel into the fuel tank 15.

The fuel filling port 56 is disposed at a top part of the fuel filling joint 57. The fuel filling port 56 is oriented toward the upper left of the vehicle body 5. In filling the fuel tank 15 with fuel, the upward of the fuel filling port 56 is opened to the atmosphere in a state in which the fuel filling port lid 62 is opened. Thus, in charging high pressure gas, for example, hydrogen gas as fuel, into the fuel tank 15, even if the high pressure gas leaks, the leaked fuel diffuses toward the upward of the fuel cell vehicle 1 without residing therein.

A fuel filling main valve 58 and a fuel supply main valve 59 are integrated and incorporated in a tank valve 63 provided on the top part of the rear-side mirror plate of the pressure vessel 55. The tank valve 63 is disposed in a space surrounded by the guard frame 29. The fuel supply main valve 59 includes a shut-off valve (not shown) and a primary pressure reducing valve (not shown). The fuel filling main valve 58 and the shut-off valve of the fuel supply main valve 59 are an on-off valve using an electromagnetic valve. The primary pressure reducing valve and the secondary pressure reducing valve of the fuel supply main valve 59 successively reduce and thereby adjust the pressure of the high pressure fuel gas from the pressure vessel 55.

The rechargeable battery 16 is a box-shaped lithium ion battery. The rechargeable battery 16 is disposed in the front end part of the instrument mounting region 36 and between the rear half part of the pressure vessel 55, that is, the rear half part of the cylindrical barrel and the rear-side mirror plate, and the front half part 13a of the seat 13.

Note that, the fuel cell vehicle 1 includes, besides the rechargeable battery 16, a second rechargeable battery (not shown) supplying, for example, 12V-based power as a power supply for meters (not shown) and lights (not shown). The second rechargeable battery is disposed around the head pipe 21, for example, beside the right side of the head pipe 21.

In the fuel cell vehicle 1, even if hydrogen gas as fuel leaks from the fuel filling port 56, the hydrogen gas, which is lighter than air, moves up, thus diffusing to the outside of the fuel cell vehicle 1 without residing within the fuel cell vehicle 1. Even if hydrogen gas as fuel leaks from the fuel filling main valve 58 or the fuel supply main valve 59, the hydrogen gas moves toward the tire house region 37, thus diffusing to the outside of the fuel cell vehicle 1 without residing within the fuel cell vehicle 1.

The power management apparatus 17 is disposed between the rechargeable battery 16 and the fuel cell 2 in the instrument mounting region 36, and is secured to the frame 11. Note that the power management apparatus 17 may be disposed along with the rechargeable battery 16 in a same waterproof case.

By disposing the rechargeable battery 16, the power management apparatus 17, and the fuel cell 2 in a manner as described above, it becomes possible to dispose apparatuses adjoining to each other in the electrical connection to be closer to each other as much as possible, thus shortening the wiring length between the apparatuses, and reducing the weight relating to the wiring.

The vehicle controller 19 is disposed around the head pipe 21 being a relatively high place in the fuel cell vehicle 1, for example, beside the left side of the head pipe 21 corresponding to the opposite side of the second rechargeable battery, which supplies 12V-based power.

Next, piping fitting arrangement of the fuel cell vehicle 1 will be described in detail.

Figure 4:
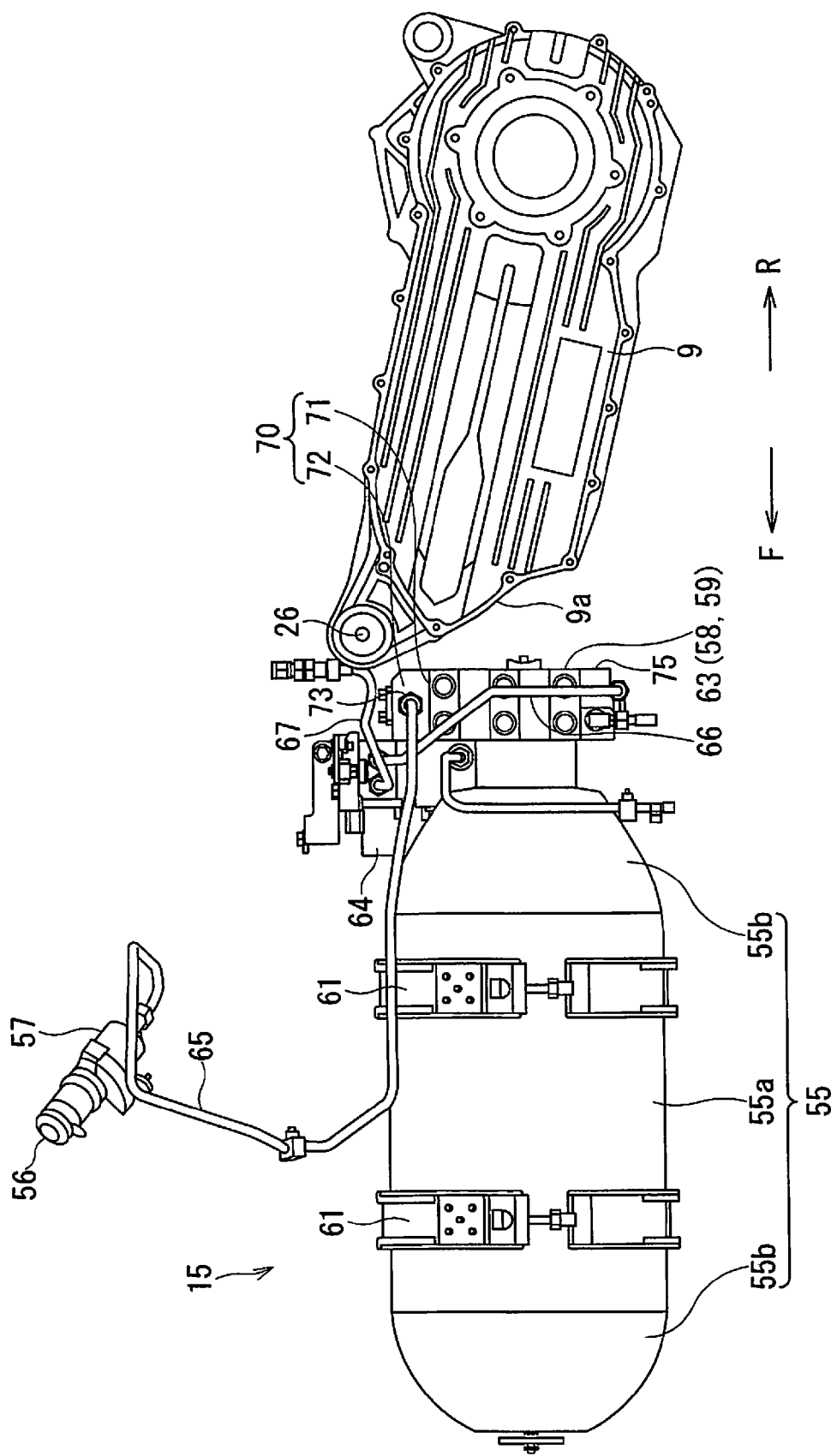
FIG. 4 is a left side view of a fuel tank, and a swing arm of the fuel cell vehicle according to the present invention.
Figure 5:
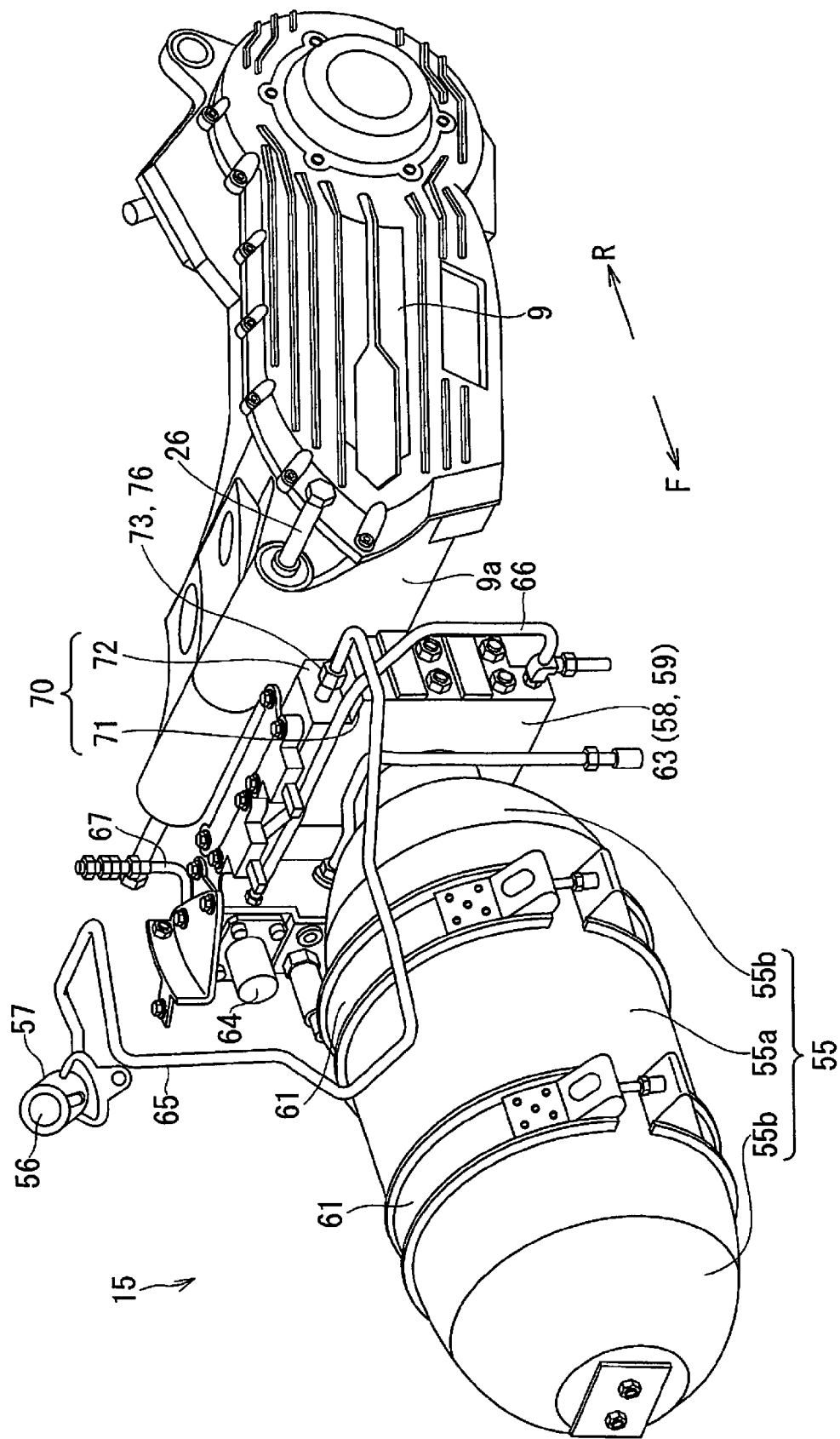
FIG. 5 is a perspective view of the fuel tank, and the swing arm of the fuel cell vehicle according to the present invention.
Figure 6:
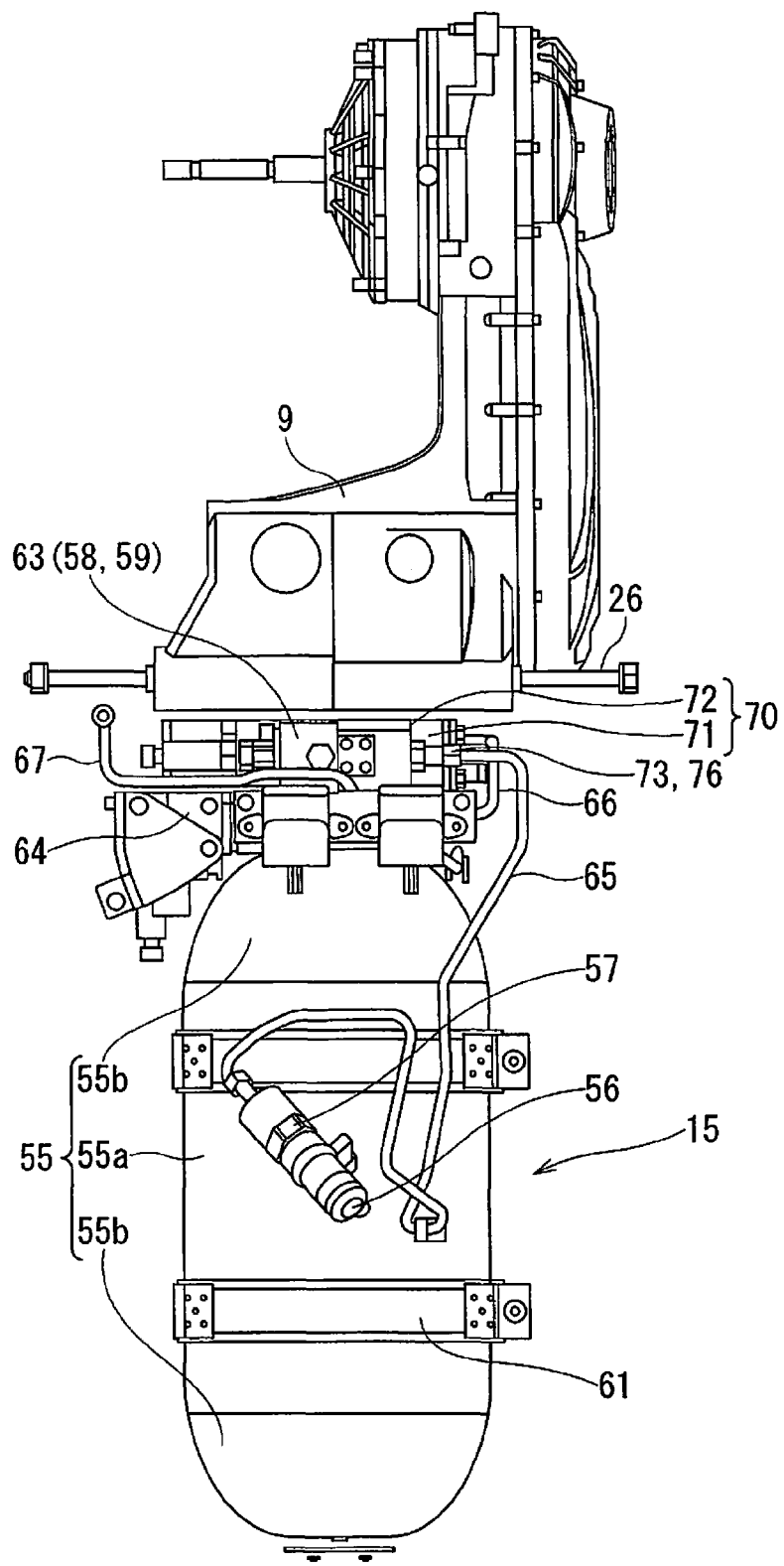
FIG. 6 is a plan view of the fuel tank, and the swing arm of the fuel cell vehicle according to the present invention.

As illustrated in FIGS. 4 to 6, a pressure vessel 55 of the fuel cell vehicle 1 according to the present embodiment includes a cylindrical body portion 55a, and a domy end plates 55b provided in front and rear end faces of the body portion 55a. The body portion 55a has a center line along a longitudinal direction of the vehicle body 5.

The end plate 55b on a rear side of the pressure container 55 is provided with a tank valve module 63 serving as a valve module. The tank valve module 63 includes a fuel filling main valve 58 being connected to the fuel filling joint 57 through fuel filling piping 65. The fuel filling piping 65 is fuel piping. The fuel filling piping 65 injects high-pressure gas (before being reduced in pressure in the tank valve module 63 into the tank valve module 63) for example, hydrogen gas as fuel being supplied from a fuel supplying apparatus outside the fuel cell vehicle 1, i.e. an equipment side.

The tank valve module 63 includes a fuel supplying main valve 59 as a shut-off valve and a primary pressure reducing valve connected to a secondary pressure reducing valve 64 through a first fuel supplying piping 66. The secondary pressure reducing valve 64 is connected to the fuel cell 2 through a second fuel supplying piping 67.

High-pressure gas injected from the fuel filling joint 57 through the fuel filling piping 65 is supplied into the pressure vessel 55 through the fuel filling main valve 58 in the tank valve module 63, and is stored. The high-pressure gas in the pressure vessel 55 is reduced in pressure particularly by the fuel supplying main valve 59 of the tank valve module 63, and is reduced in pressure again by the secondary pressure reducing valve 64 after flowing through the first fuel supplying piping 66, and then is supplied to the fuel cell 2 through the second fuel supplying piping 67.

Figure 7:
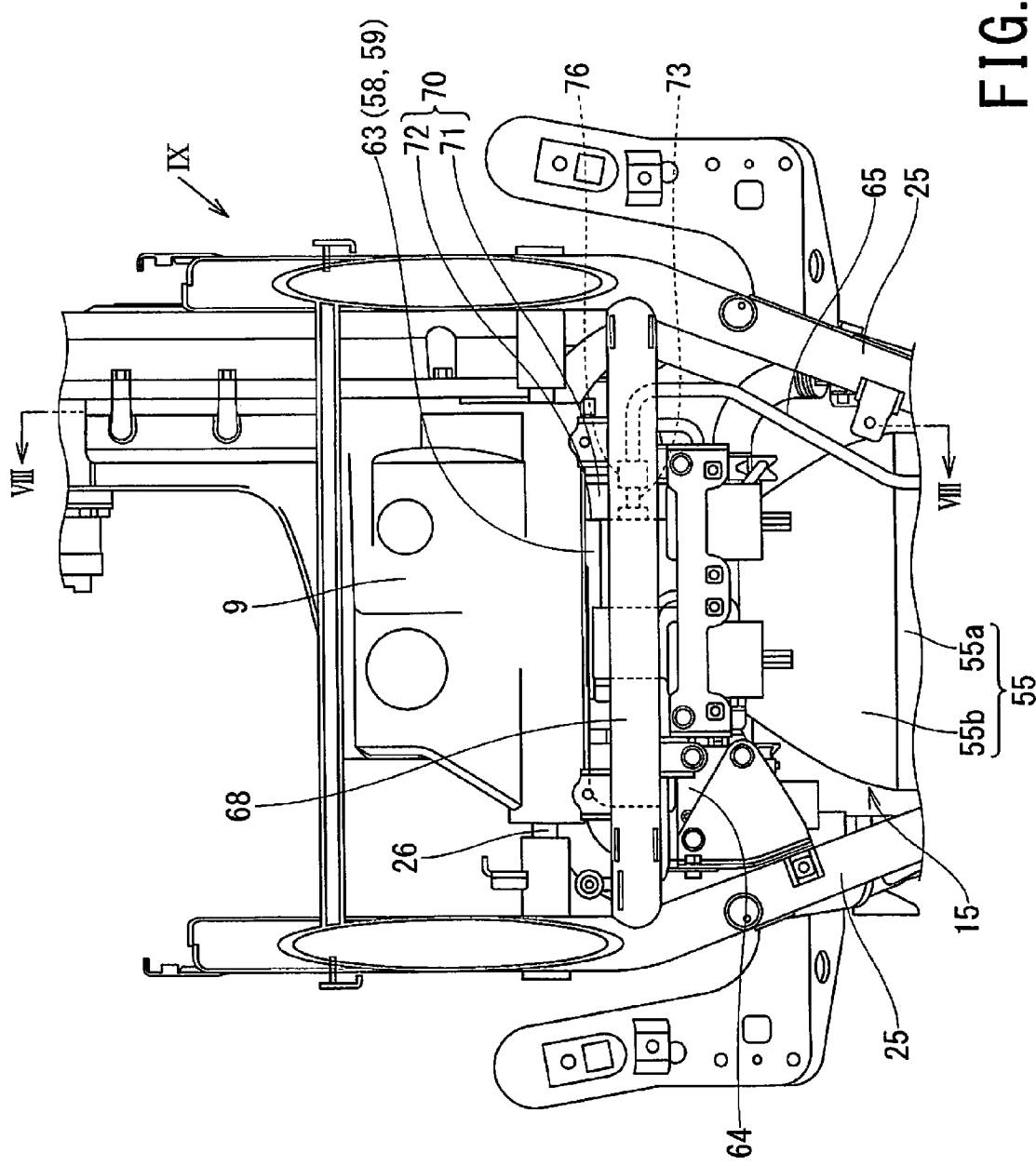
FIG. 7 is a sectional view taken along line VII-VII of FIG. 2.
Figure 8:
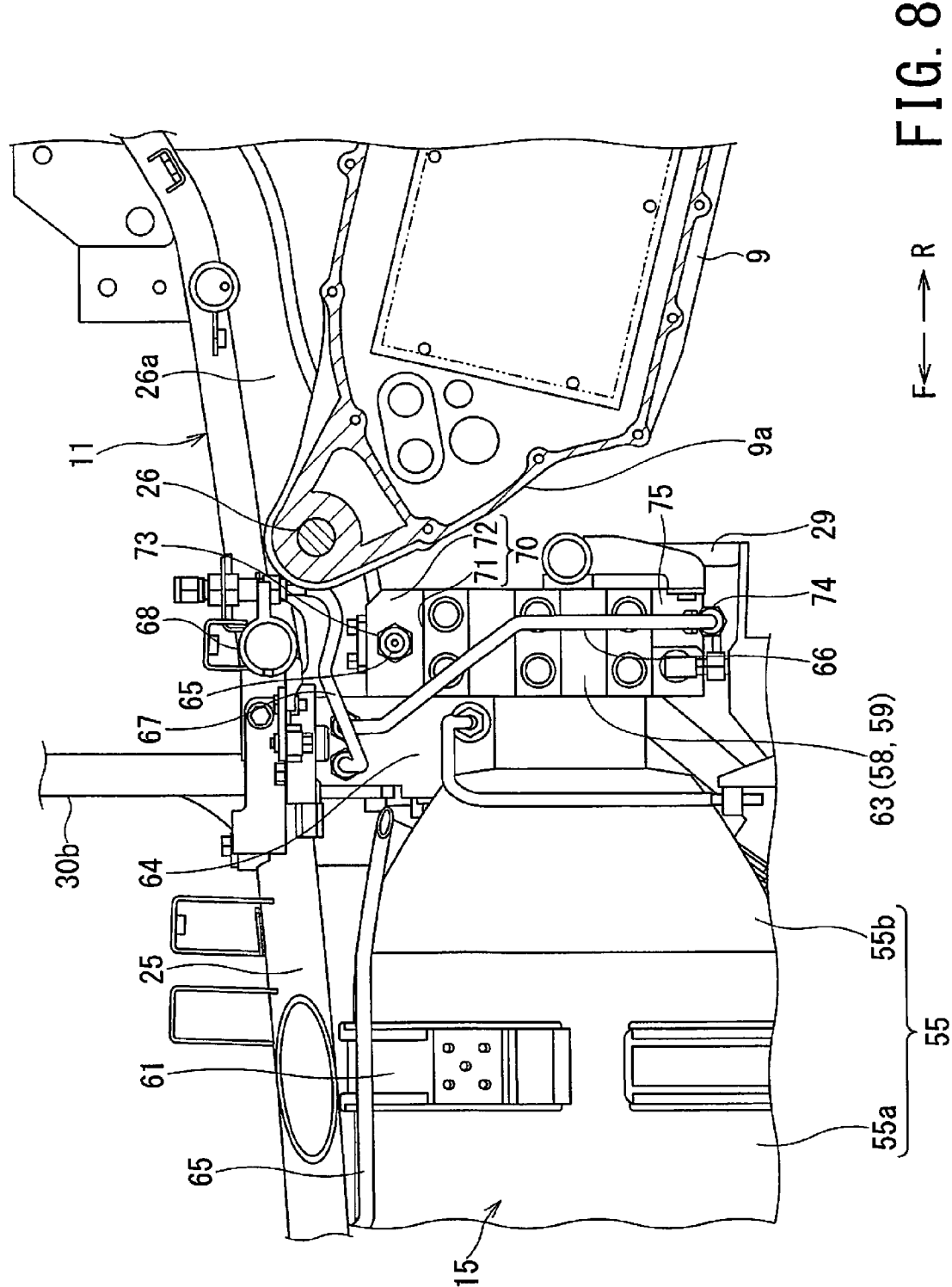
FIG. 8 is a sectional view taken along line VIII-VIII of FIG. 7.
Figure 9:
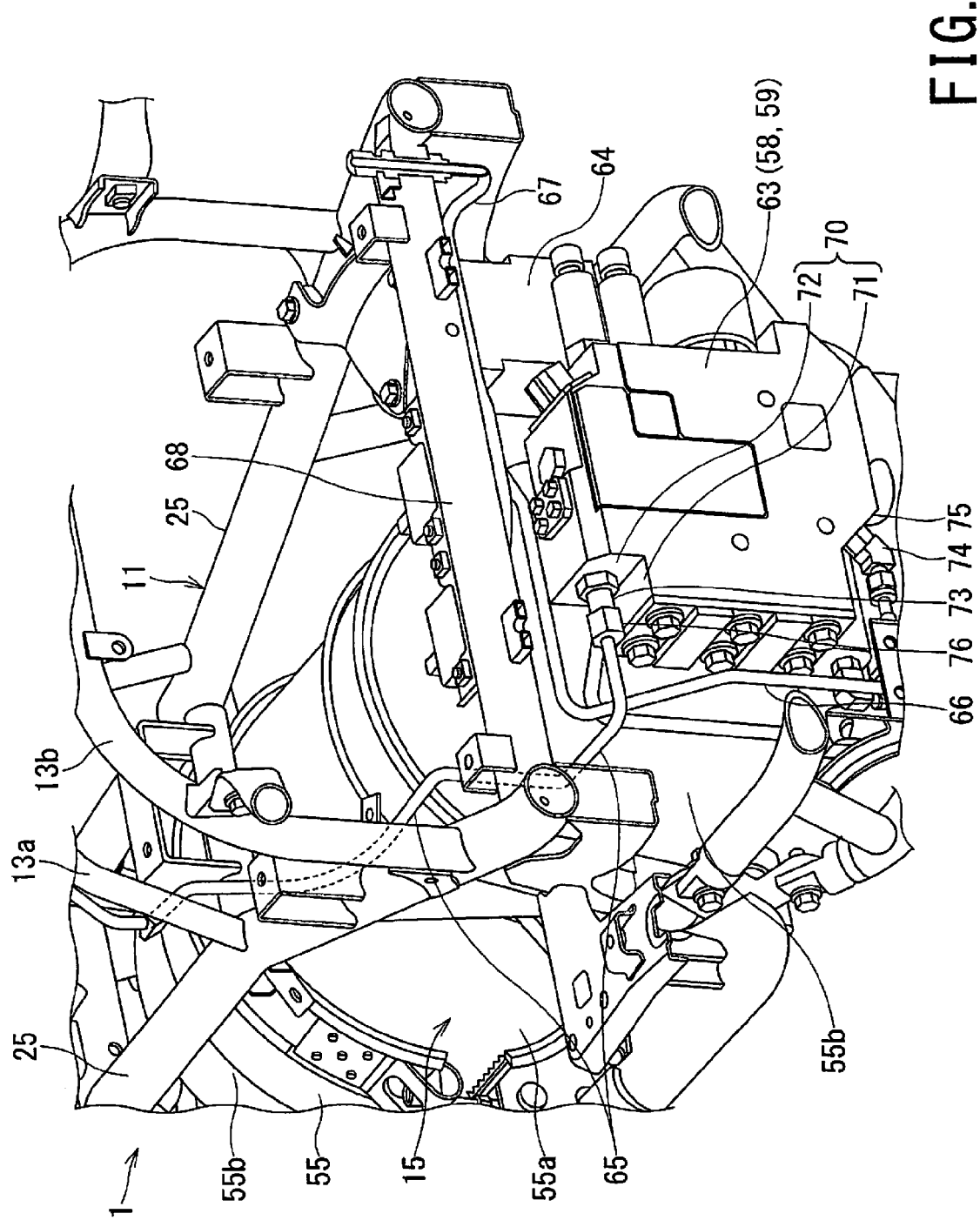
FIG. 9 is an illustration of FIG. 7 as viewed from a direction of an arrow IX.

As illustrated in FIGS. 7 to 9, the frame 11 of the fuel cell vehicle 1 according to the present embodiment includes a cross member 68. The cross member 68 is provided at a substantially central portion of the left and right upper frames 25 in a longitudinal direction of the fuel cell vehicle 1. The tank valve module 63 is disposed below, for example, immediately below the cross member 68. A pivot shaft 26 for supporting the swing arm 9 in a swingable manner is provided between the left and right brackets 26a behind the cross member 68. That is, the cross member 68 is disposed above the tank valve module 63 along a width direction of the fuel cell vehicle 1, and the pivot shaft 26 as a front end of the swing arm 9 is disposed behind and above the tank valve module 63 along the width direction of the fuel cell vehicle 1.

A cut-out stepped portion 70 is provided on one side-face side, e.g. a left-side-face side in an upper portion of the tank valve module 63. The cut-out stepped portion 70 includes a cut-out top face 71, and a cut-out side face 72 extending upward from a back of the cut-out top face 71. That is, the cut-out stepped portion 70 is disposed at an upper left corner of the tank valve module 63 as viewed from the rear of the vehicle. The cut-out stepped portion 70 includes the cut-out top face 71 positioned lower than a top face of the tank valve module 63 in the vertical direction of the fuel cell vehicle 1, and the cut-out side face 72 being a vertical wall connecting between a left edge of the top face of the tank valve module 63 and a right edge of the cut-out top face 71. The cut-out stepped portion 70 is defined by the cut-out top face 71 and the cut-out side face 72. The cut-out side face 72 is parallel to the longitudinal direction of the fuel cell vehicle 1, and is perpendicular to the width direction of the fuel cell vehicle 1. The cut-out top face 71 is parallel to the longitudinal direction of the fuel cell vehicle 1, and is substantially horizontal. It is desirable that the cut-out top face 71 and the cut-out side face 72 are disposed at a right angle.

The cut-out stepped portion 70 includes the cut-out side face 72 to which a filling-side piping fitting 73 connecting the fuel filling piping 65 to the tank valve module 63 is attached. The filling-side piping fitting 73 is screwed into the cut-out side face 72 to be attached thereto in such a manner that the filling-side piping fitting 73 projects from the cut-out side face 72 toward a side, which is left side of the fuel cell vehicle 1. The filling-side piping fitting 73 has a center axis extending in the width direction of the fuel cell vehicle 1. The filling-side piping fitting 73 is disposed parallel to the cut-out top face 71.

The fuel filling piping 65 extends from the filling-side piping fitting 73 in the axial direction of the filling-side piping fitting 73. A leading end of the fuel filling piping 65 is attached to a leading end (left end) of the filling-side piping fitting 73 with a nut 76 to be tightened in the axial direction of the filling-side piping fitting 73. The nut 76 for attaching the fuel filling piping 65 to the filling-side piping fitting 73 is positioned above the cut-out top face 71.

The filling-side piping fitting 73 is disposed between the cross member 68 provided between the left and right upper frames 25, and the cut-out top face 71 of the tank valve module 63, in the vertical direction of the fuel cell vehicle 1. That is, the cross member 68 is disposed above the filling-side piping fitting 73, and the cut-out top face 71 is disposed below the filling-side piping fitting 73. Thus, the fuel cell vehicle 1 prevents a tool, such as a spanner and a monkey wrench, from being used to the nut 76 from below and above the fuel cell vehicle 1 to prevent illegally access to the filling-side piping fitting 73, and the filling-side piping fitting 73 is protected.

In assembly work of the fuel cell vehicle 1, connection work of the filling-side piping fitting 73 and the fuel filling piping 65, that is tightening work of the nut 76 is performed before the swing arm 9 is attached to the pivot shaft 26. A state without the swing arm 9 allows a tool to approach the nut 76 from the rear of the vehicle body 5, and allows movement or swing of the tool for tightening the nut 76 in a space between the cross member 68 and the cut-out top face 71. Thus, the connection work of the filling-side piping fitting 73 and the fuel filling piping 65 is facilitated.

A supplying-side piping fitting 74 connecting the first fuel supplying piping 66 to the tank valve module 63 is attached to an inclined surface 75 in a bottom portion of the tank valve module 63.

As illustrated in FIGS. 4 to 6, and 8, the pivot shaft 26 of the fuel cell vehicle 1 according to the present embodiment is provided behind the cross member 68. The swing arm 9 swinging around the pivot shaft 26 is disposed behind the filling-side piping fitting 73. The swing arm 9 has a front end portion 9a overlapping with the filling-side piping fitting 73 as viewed from the longitudinal direction of the fuel cell vehicle 1. That is, the cut-out top face 71, the filling-side piping fitting 73, and the cross member 68 is disposed in front of the front end portion 9a of the swing arm 9. The front end portion 9a of the swing arm 9 is closer to a side, for example, left side of the fuel cell vehicle 1 than the filling-side piping fitting 73 in the width direction of the fuel cell vehicle 1. The fuel cell vehicle 1 includes the filling-side piping fitting 73 attached to the cut-out side face 72 of the tank valve module 63, and thus when the swing arm 9 is attached to the pivot shaft 26 after the fuel filling piping 65 is connected to the tank valve module 63, the swing arm 9 supported by the pivot shaft 26 prevents a tool approaching the nut 76 from the rear of the fuel cell vehicle 1. Thus, illegally access to the filling-side piping fitting 73 by using the tool is prevented and the filling-side piping fitting 73 is protected.

In addition, positioning the tank valve module 63 on a right side of the filling-side piping fitting 73 prevents a tool approaching the nut 76 from a right side of the fuel cell vehicle 1. The fuel filling piping 65 projecting in a width direction of the fuel cell vehicle 1 on a left side of the filling-side piping fitting 73 and the bracket 26a disposed on the left side prevent the tool approaching the nut 76 from a left side of the fuel cell vehicle 1. The fuel tank 15 disposed on a front side of the filling-side piping fitting 73 prevents the tool approaching the nut 76 from a front side of the fuel cell vehicle 1.

The fuel cell vehicle 1 according to the present embodiment is configured as described above, and thus achieves the following effects (1) and (2).

(1) As illustrated in FIGS. 7 to 9, the fuel cell vehicle 1 according to the present embodiment includes the filling-side piping fitting 73 disposed between the cross member 68 provided between the upper frames 25, and the cut-out top face 71 of the tank valve module 63, in the vertical direction of the fuel cell vehicle 1, and thus the cross member 68 and the cut-out top face 71 prevent the tool approaching the nut 76 from the vertical direction to protect the filling-side piping fitting 73. Thus, the fuel cell vehicle 1 reliably prevent a tool illegally accessing the nut 76 from the vertical direction of the fuel cell vehicle 1 without increasing the number of components and cost by adding a protective component.

(2) The fuel cell vehicle 1 according to the present embodiment includes the swing arm 9 supported to be swingable around the pivot shaft 26, the swing arm 9 being disposed behind the filling-side piping fitting 73 so that the front end portion 9a of the swing arm 9 overlaps with the filling-side piping fitting 73 as viewed from the vehicle longitudinal direction, and thus the swing arm 9 prevents a tool approaching the nut 76 from the rear of the fuel cell vehicle 1 to protect the filling-side piping fitting 73. Thus, the fuel cell vehicle 1 reliably prevent a tool illegally accessing the nut 76 from the rear of the fuel cell vehicle 1 after the swing arm 9 is attached to the pivot shaft 26, without increasing the number of components and cost.

Therefore, the fuel cell vehicle 1 according to the present invention, the piping fitting connecting the fuel piping to the valve module is disposed between the cross member of the frame and the cut-out top face of the valve module in the vertical direction of the fuel cell vehicle, and thus the cross member and the cut-out top face protect the piping fitting in the vertical direction of the fuel cell vehicle. Thus, the present invention surely prevent illegally access by using a tool to the piping fitting without increasing the number of components.

Although the embodiment of the present invention is described as above, the embodiment is presented as an example. Thus, there is no intention to limit the scope of the invention. The embodiment can be practiced in other various aspects, and thus various omissions, replacements, and modifications may be made within a range without departing from the essence of the invention.

What is claimed is:

1. A fuel cell vehicle comprising:
   a frame having a cross member;
   an electric motor driving a driving wheel;
   a fuel cell supported by the frame to supply electric power to the electric motor;
   a fuel tank supported by the frame to store fuel to be supplied to the fuel cell;
   a valve module disposed below the cross member and behind the fuel tank;
   fuel piping; and
   a piping fitting connecting the fuel piping to the valve module,
   wherein the valve module includes a cut-out stepped portion provided on a side-face side in an upper portion of the valve module, the cut-out stepped portion being defined by a cut-out top face and a cut-out side face extending upward from the cut-out top face, and
   the piping fitting is attached to the cut-out side face, the piping fitting being disposed between the cross member and the cut-out top face in the vehicle vertical direction.

2. The fuel cell vehicle according to claim 1, further comprising:
   a swing arm disposed behind the piping fitting to support the driving wheel; and
   a pivot shaft disposed behind the cross member to support the swing arm in the frame in a swingable manner,
   wherein the swing arm has a front end portion overlapping with the piping fitting as viewed from the fuel cell vehicle longitudinal direction.

* * * * *